United States Patent [19]
Watland

[11] 3,754,616
[45] Aug. 28, 1973

[54] DRIVE MECHANISM FOR MOWERS

[75] Inventor: Frank C. Watland, Saukeville, Wis.

[73] Assignee: Ataco Steel Products Co., Grafton, Wis.

[22] Filed: Dec. 17, 1971

[21] Appl. No.: 209,245

[52] U.S. Cl................. 180/74, 56/DIG. 4, 74/432, 74/461, 74/DIG. 10, 180/19 R
[51] Int. Cl......................................... B62d 51/04
[58] Field of Search.............. 180/19 R, 19 H, 19 S, 180/74; 56/16.9, DIG. 4; 74/13, 432, 461, DIG. 10; 308/72

[56] References Cited
UNITED STATES PATENTS

| 2,944,616 | 7/1960 | Bernard et al. | 180/74 X |
|---|---|---|---|
| 2,963,103 | 12/1960 | Wood et al. | 180/74 X |
| 3,396,809 | 8/1968 | Kortum | 180/74 X |
| 2,809,705 | 10/1957 | Sewell | 180/19 H |
| 2,824,415 | 2/1958 | Frazier | 180/74 X |
| 2,886,934 | 5/1959 | Jepson | 180/74 X |
| 2,995,946 | 8/1961 | Harvey | 308/72 X |

OTHER PUBLICATIONS
"Plastics in the Automotive Industries," Automotive Industries, Apr. 1, 1961, pages 47–52

Primary Examiner—Benjamin Hersh
Assistant Examiner—Leslie J. Paperner
Attorney—James E. Nilles

[57] ABSTRACT

A lawn mower having a drive mechanism for the wheels of the mower, which mechanism includes a drive shaft and drive cog wheels for engagement with the ground wheels, the drive shaft and drive cog wheels being mounted on a pair of swingable arms whereby the drive cog wheels maintain driving mesh with the ground wheels at all times. The drive mechanism can accommodate ground wheels of different sizes.

The drive cog wheels themselves have a bearing formed integrally therewith at one side, and which bearing is journalled in a bearing seat formed in each of the arms. The arms themselves are held in properly spaced relationship so that their bearing seats properly engage and journal the bearings on the drive cog wheels.

9 Claims, 5 Drawing Figures

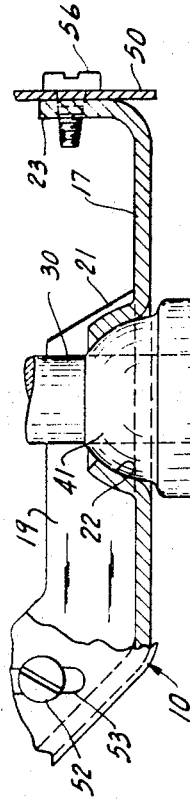
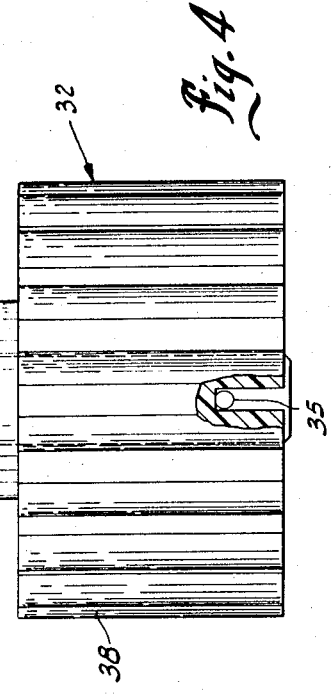
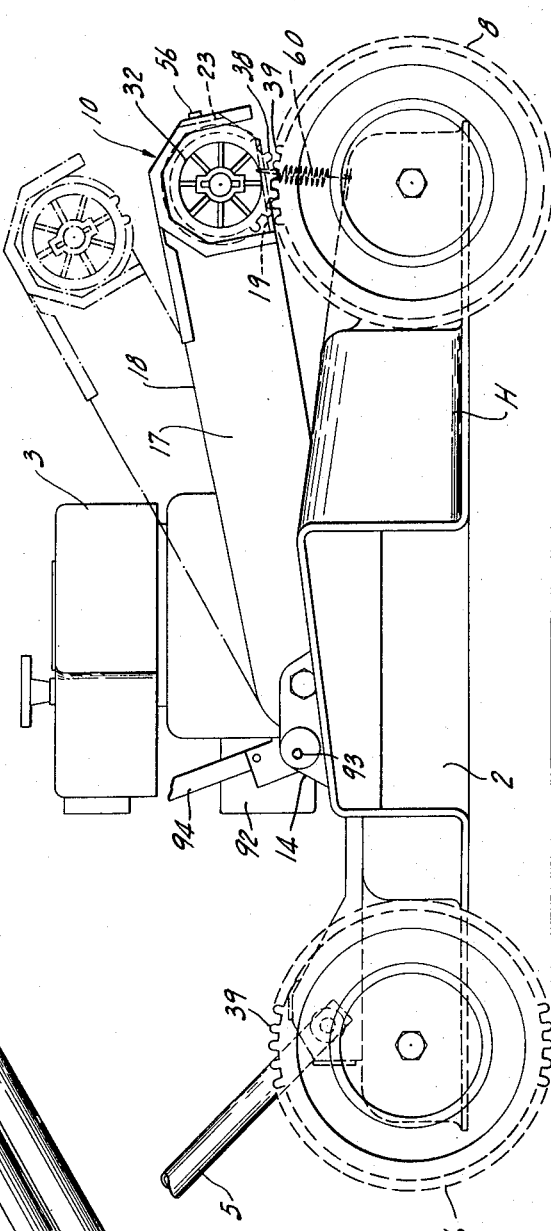
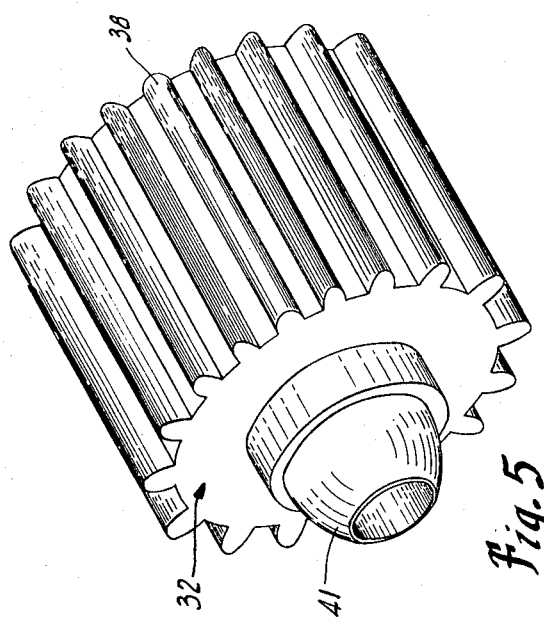

DRIVE MECHANISM FOR MOWERS

BACKGROUND OF THE INVENTION

The invention pertains to lawn mowers of the type wherein the ground wheels are power driven, which mowers are commonly referred to as self-propelled. Various prior art mowers have been proposed wherein means are provided for driving on the periphery of the ground wheels. These devices have not proved to be entirely satisfactory however, because of the difficulty in maintaining the driving engagement with the ground wheels, complexity and cost of the various parts involved, and difficulty in maintaining the various parts in proper operating condition. Furthermore, these drives often became inoperative because of the accumulation of mud, dirt, grass or other foreign objects in the drive mechanism.

SUMMARY OF THE INVENTION

The present invention provides a lwan mower having a driving mechanism for the ground wheels, which mechanism is mounted by a pair of swinging arms and includes a power shaft having a drive cog wheel at each end for engagement with a pair of the ground wheels of the mower. The drive cog wheels have integrally formed bearings on one of their sides, which bearings are adapted to be accurately seated and journalled in complementary shaped bearing seats in the pair of swingable arms. The arms are held in properly spaced relationship so as to insure that the bearings of the drive cog wheels are held in proper operating relationship with the bearing seats on the arms. The distance between the bearing seats of the two arms can be accurately adjusted and held in place by an adjustable cover.

The drive mechanism provided by the present invention consists of a minimum number of parts for the function obtained, is economical to manufacture and is troublefree in operation. The drive mechanism assures positive engagement of the cog drive wheels with the ground wheels at all times. The drive mechanism is unaffected by foreign matter and slippage of the drive is eliminated.

The drive mechanism provided by the present invention can easily accommodate ground wheels of various sizes.

These and other objects and advantages of the present invention will appear hereinafter as this disclosure progresses, reference being had to the accompanying drawings.

BRIEF DESCRIPTION OF THE DRAWINGS

FIG. 3 is a right side elevational view of the mower shown in FIG. 1 and showing the drive mechanism in broken lines when moved to a non-driving position;

FIG. 4 is a plan view of one of the drive cog wheels on an enlarged scale, and with certain parts shown as broken away or in section for the sake of clarity; and FIG. 5 is an enlarged, perspective view of one of the drive cog wheels and showing the bearing formed integrally therewith.

DESCRIPTION OF A PREFERRED EMBODIMENT

Figure 1:
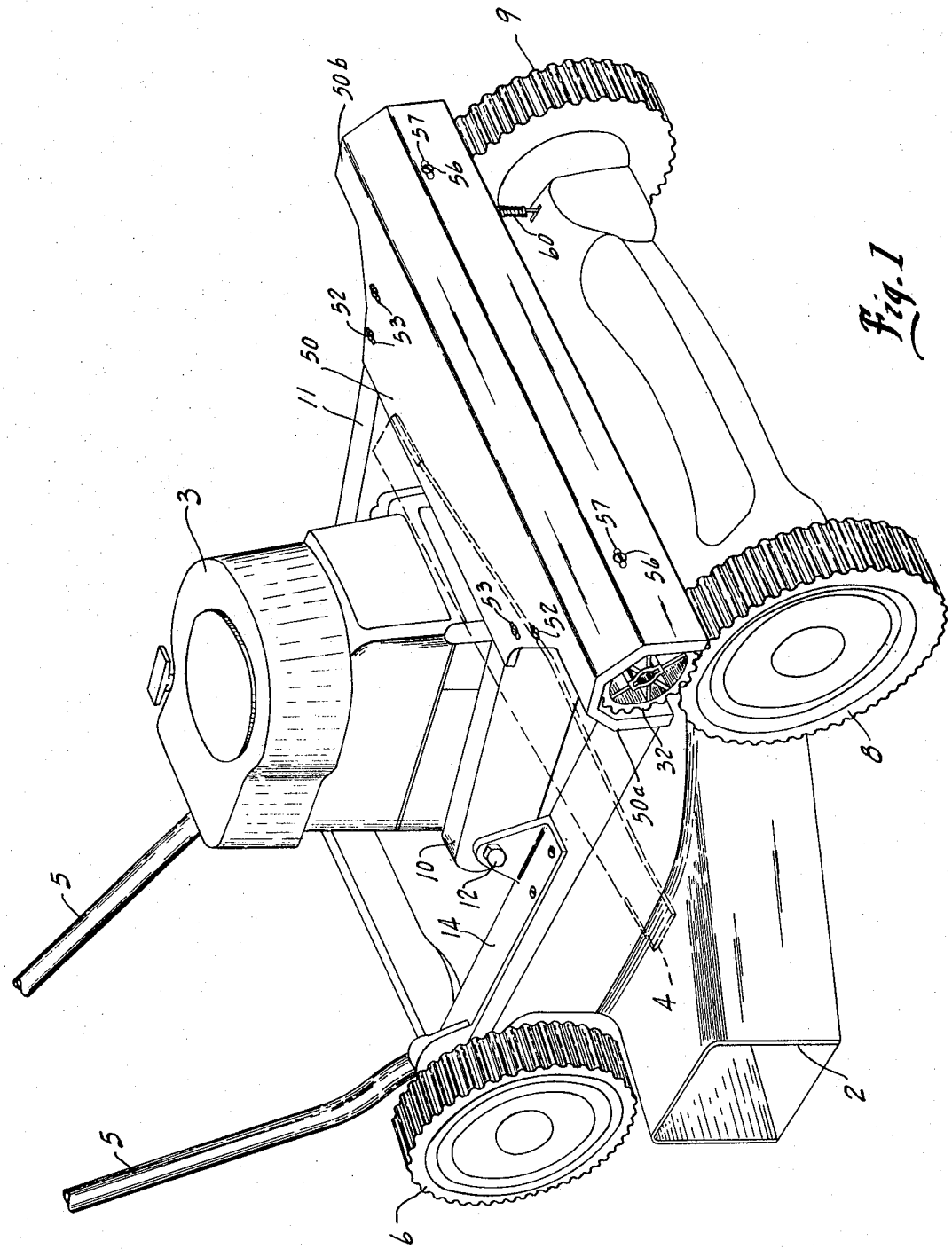
FIG. 1 is a perspective view of a mower embodying the present invention.
Figure 2:
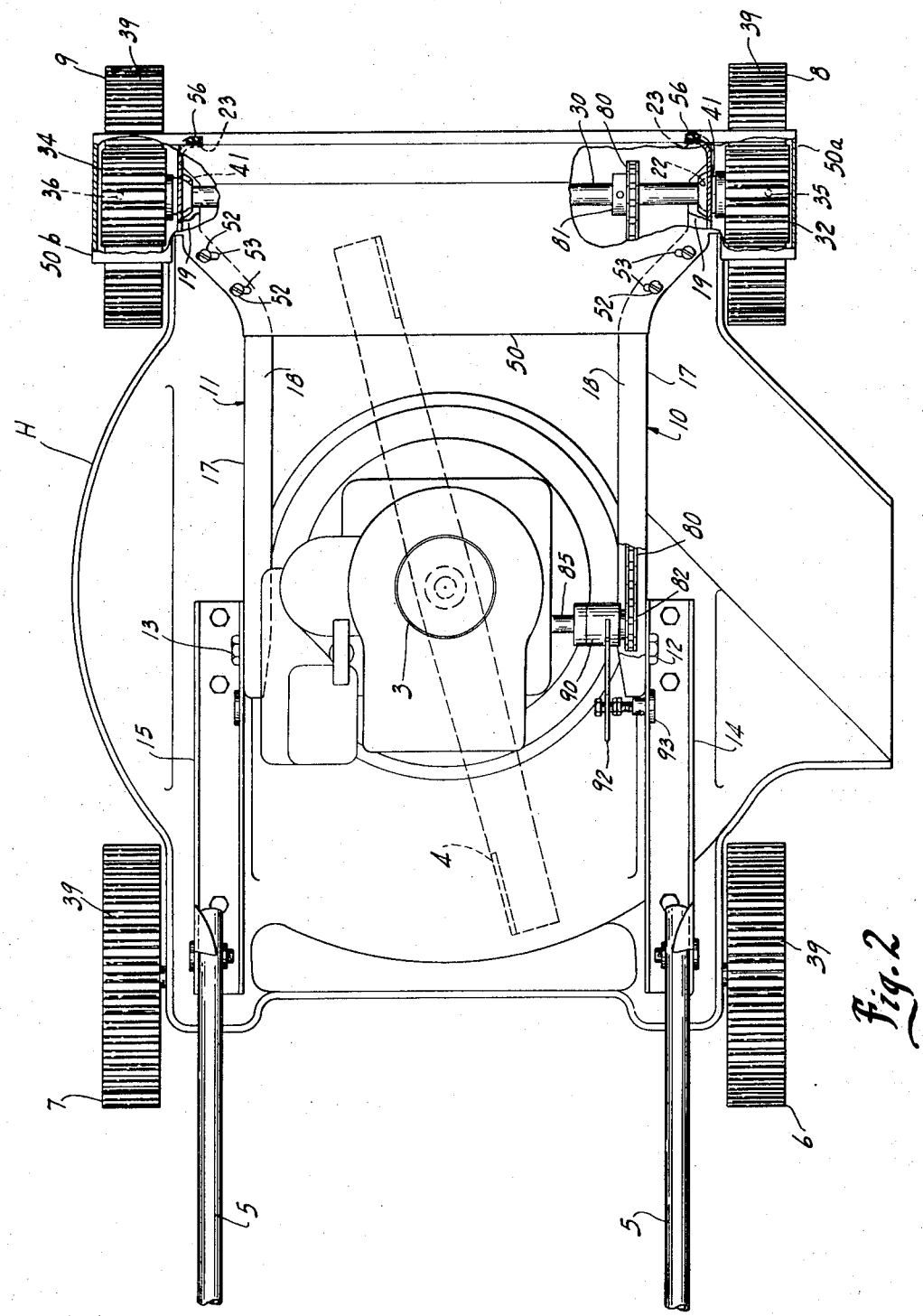
FIG. 2 is a plan view of the mower shown in FIG. 1.

The mower shown for purposes of illustrating the invention includes a housing H having a side discharge opening 2 and on which a power plant such as an internal combustion engine 3 is centrally mounted.

The engine 3 drives the rotary blade 4 in the known manner. An operator's handle 5 extends rearwardly from the mower and a pair of rear ground engaging wheels 6 and 7 are rotatably mounted at the rear of the mower. The mower also has a pair of front ground engaging wheels 8 and 9 which are also journalled in the housing H. The drive mechanism provided by the present invention includes a pair of laterally spaced arms 10 and 11 which are swingably mounted on the pivot bolts 12 and 13, respectively, that extend through the rear end of the arms and also through the brackets 14 and 15 securely attached to the housing in any suitable manner. The arms themselves are fabricated from sheet steel and as they are identical, only one will be described in detail. In any event, the arms include a vertical side wall 17, an upper, inwardly turned flange 18 and a lower, inwardly turned flange 19. Flanges 18 and 19 extend along the length of the arm but terminate at their forward ends 20. The side walls 17 of the arms have a generally semi-spherical bearing seat 22 formed adjacent their forward ends by means of being stamped therein. The side wall 17 then extends forwardly and terminates in an inwardly turned, front flange 23.

A drive shaft 30 has drive cog wheels 32 and 34 mounted at either of its ends and held captive thereon by their respective pins 35, 36. The drive cog wheels have a series of peripheral teeth 38 which are in driving mesh with the teeth 39 of the front ground wheels.

The drive cog wheels are preferably made of DuPont nylon and have a semi-spherical bearing 41 formed integrally on one of their sides. The bearings 41 are adapted to be seated in and thus journalled in the bearing seats 22 which have been stamped in the arms 10 and 11. Thus, the distance between the bearings 41 is fixed and it is necessary for the arms 10 and 11 to be properly spaced in a lateral direction so that the bearings 41 accurately and firmly seat themselves in the bearing seats 22 of the swingable arms. To insure that this alignment is maintained, a cover 50 is provided between and adjustably connected to the forward ends of the arms. More specifically, the cover is held on the arms by the screws 52 which extend through laterally disposed slots 53 in the cover and then are threadably engaged in the upper, inwardly turned flanges 10 and 11 of the arms.

Another front screw 56 extends through a laterally disposed slot 57 in the front of the housing and these screws 56 then threadably engage the inwardly turned flanges 23 of the arms. In this manner, the distance between the arms can be accurately adjusted and held in that position by tightening the screws 52 and 56.

A pair of springs 60, one on each side, are connected between the mower housing and the lower portion of each of the swingable arms so as to hold the drive cog wheels 38 in constant driving mesh with the teeth 39 of the ground wheels.

Power is furnished from the engine 3 to the power shaft 30 by means of the roller chain 80 which is trained over a sprocket 81 fixed on shaft 30 and a sprocket 82 which is fixed on the power shaft 85 which in turn is connected to the motor. A disengagable clutch 90 is interposed in the power shaft 85 and the sear 92 pivoted at 93 is actuated by the operator's handle 94 to selectively engage or disengage the clutch 90 as desired.

It will also be noted that the cover 50 has laterally extending portions 50a and 50b which extend over and cover the drive cog wheels, thereby protecting them as well as providing a safety device.

The entire driving mechanism is economical to manufacture, consists of a minimum number of parts and is troublefree in operation and maintenance. The slotted cover adjustment insures that the bearings 41 are properly seated at all times in the bearing seats 22 of the swingable arms.

The driving mechanism can easily accommodate the front ground wheels of various size.

I claim:

1. A drive mechanism for a lawn mower of the type having a pair of ground engaging wheels and with teeth around the periphery thereof, a housing on which said wheels are mounted, and a power source on said housing, said drive mechanism comprising; a pair of arms swingably mounted on said housing and extending forwardly and having front ends adjacent said pair of ground engaging wheels, said arms having bearing seats formed integrally in their said front ends, a cover between the said front ends of said arms, means for attaching said cover to said arms including adjustment means between said cover and said arms whereby the lateral distance between the bearing seats of said arms can be adjusted, a power shaft having a drive cog wheel fixed adjacent and to each end thereof, each of said drive cog wheels having an integrally formed bearing on their laterally inner sides, said bearing adapted to be journalled in said bearing seats of their respective arms, and means for driving said power shaft from said power source, said cog wheels having peripheral teeth for driving engagement with the teeth of said ground wheels.

2. The mechanism set forth in claim 1 further characterized in that said cover has laterally extending portions that cover said drive cog wheels.

3. The mechanism set forth in claim 1 further characterized in that said arms are fabricated from sheet metal and said bearing seats are formed by being stamped in said sheet metal arms.

4. The mechanism as set forth in claim 3 wherein said drive cog wheels are formed of DuPont nylon and said bearings are formed integrally therewith.

5. Drive mechanism for a lawn mower of the type having a pair of ground engaging wheels and with teeth around the periphery thereof, a housing on which said wheels are mounted, and a power source on said housing, said drive mechanism comprising; a pair of arms swingably mounted on said housing and extending forwardly and having front ends adjacent said pair of ground engaging wheels, said arms being fabricated from sheet metal and having bearing seats formed adjacent their front ends by being stamped in said sheet metal arms, a power shaft having a drive cog wheel fixed adjacent and to each end thereof, each of said drive cog wheels having an integrally formed bearing on their laterally inner sides, said cog wheels having teeth around their periphery for driving engagement with the teeth of said ground wheels, a cover between the said front ends of said arms, means for attaching said cover to said arms including adjustment means between said cover and said arms whereby the lateral distance between the bearing seats of said arms can be adjusted, said cover having laterally extending portions that cover said drive cog wheels, said bearing adapted to be journalled in said bearing seats of their respective arms, and means for driving said power shaft from said power source.

6. Drive mechanism for a lawn mower and comprising; a pair of arms having means for mounting said mechanism on said mower, said arms having front ends and bearing seats formed integrally in said front ends, a cover between the said front ends of said arms, means for attaching said cover to said arms including adjustment means between said cover and said arms whereby the lateral distance between the bearing seats of said arms can be adjusted, a power shaft having a drive cog wheel fixed adjacent and to each end thereof, each of said drive cog wheels having an integrally formed bearing on their laterally inner sides, said bearing adapted to be journalled in said bearing seats of their respective arms, and means for transmitting driving power to said shaft.

7. The mechanism set forth in claim 6 further characterized in that said cover has laterally extending portions that cover said drive cog wheels.

8. The mechanism set forth in claim 6 further characterized in that said arms are fabricated from sheet metal and said bearing seats are formed by being stamped in said sheet metal arms.

9. The mechanism as set forth in claim 8 wherein said drive cog wheels are formed of DuPont nylon and said bearings are formed integrally therewith.

* * * * *